Jan. 12, 1926.
F. A. HOBERECHT
1,569,322
VALVE STEM PACKING WASHER
Filed July 7, 1924
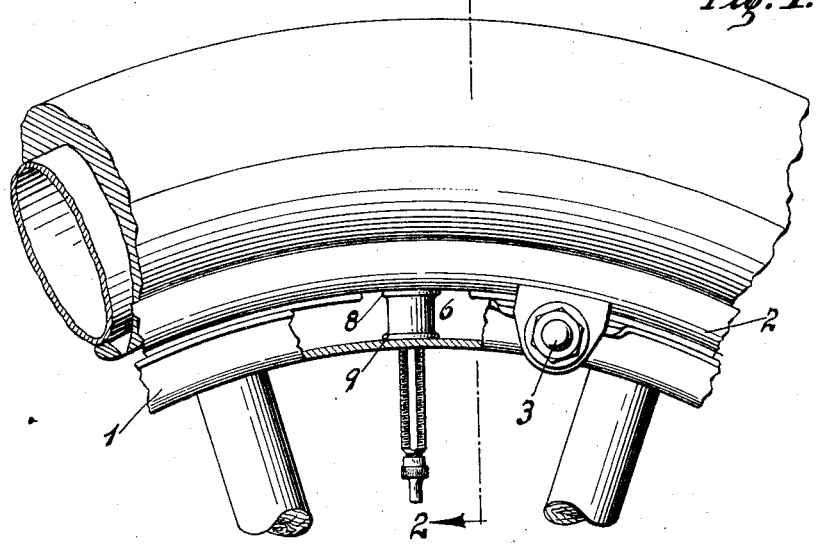
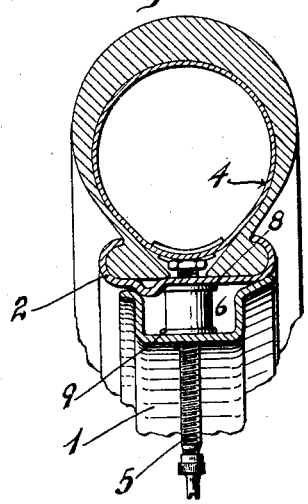
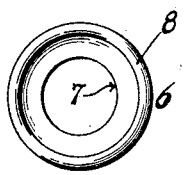
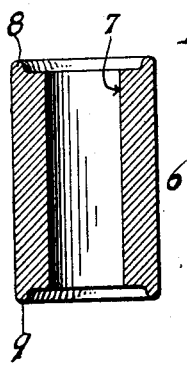
INVENTOR.
FREDERICK A. HOBERECHT.
BY
Harry C. Schweda
ATTORNEYS.

Patented Jan. 12, 1926.

1,569,322

UNITED STATES PATENT OFFICE.

FREDERICK A. HOBERECHT, OF OAKLAND, CALIFORNIA.

VALVE-STEM PACKING WASHER.

Application filed July 7, 1924. Serial No. 724,588.

*To all whom it may concern:*

Be it known that FREDERICK A. HOBERECHT, a citizen of the United States, residing at Oakland, in the county of Alameda and State of California, has invented certain new and useful Improvements in Valve-Stem Packing Washers, of which the following is a specification.

My invention is an improved valve stem packing washer.

The prime object of my invention is to provide a means whereby the entrance of moisture between the inner tube and casing through the valve stem opening may be eliminated.

Another object is to provide a washer which fits over the valve stem between the rim and felloe and is held in place by the rim bolts and without the addition of extra bolts or other fastening means.

A further object is to provide a packing washer, which may be installed with a minimum amount of labor, and which is simple in construction and inexpensive to manufacture.

In the annexed drawing in which my invention is illustrated:

Figure 1 is a fragmentary side view of a tire mounting with my washer in position thereon, and with parts broken away to show the construction.

Figure 2 is a sectional view taken on the line 2—2 of Figure 1.

Figure 3 is a plan view of my washer.

Figure 4 is a longitudinal sectional view of the same.

Referring more particularly to the drawing, my washer is preferably applied to a wheel having a pressed steel channeled felloe 1, the usual tire rim 2 is adapted to fit thereon, and is held in place by a plurality of bolts 3.

The inner tube 4 has the usual valve stem 5, which extends through the rim and felloe. My packing washer 6, substantially cylindrical in form, has a central aperture 7 therein, through which the valve stem 5 extends, and is provided with projecting rings 8 and 9 at either end thereof. The height of the washer 6 is slightly greater than the space between the rim and the felloe, so that as the rim is forced into position by the bolts 3, the washer will be compressed forcing the rings 8 and 9 tightly against the rim and felloe and efficiently sealing the openings therein around the valve. The washer 6 is formed of a yielding, pliable material, such as rubber.

Having described my invention, I claim:

In combination with a pneumatic tire, a valve stem thereon, a rim upon which said tire is mounted, and a wheel felloe upon which said rim is mounted, said valve stem being adapted to extend through said rim and felloe, a packing washer substantially cylindrical in form and having a longitudinal opening therein for the reception of the valve stem, annular projecting rings formed on the ends thereof and adapted to bear against the rim and the felloe.

In testimony whereof I affix my signature.

FREDERICK A. HOBERECHT.